(12) United States Patent
Takahashi

(10) Patent No.: US 7,471,773 B2
(45) Date of Patent: Dec. 30, 2008

(54) TELEPHONE TERMINAL

(75) Inventor: Hideaki Takahashi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 786 days.

(21) Appl. No.: 10/800,753

(22) Filed: Mar. 16, 2004

(65) Prior Publication Data
US 2004/0184585 A1 Sep. 23, 2004

(30) Foreign Application Priority Data
Mar. 18, 2003 (JP) ............................. 2003-074223

(51) Int. Cl.
*H04M 1/64* (2006.01)
(52) U.S. Cl. ................... 379/72; 379/70; 379/85; 379/388.02
(58) Field of Classification Search ............... 379/67.1, 379/79, 69, 70, 72, 85, 388.02
See application file for complete search history.

(56) References Cited

U.S. PATENT DOCUMENTS 5,442,685 A * 8/1995 Sakata et al. ............... 379/67.1
5,533,103 A * 7/1996 Peavey et al. ................. 379/69
6,654,447 B1 * 11/2003 Dewan ......................... 379/76

FOREIGN PATENT DOCUMENTS

| JP | U 60-88658 | 6/1985 |
| JP | A 60-189359 | 9/1985 |
| JP | A 09-284202 | 10/1997 |
| JP | A 10-326100 | 12/1998 |
| JP | A 11-252282 | 9/1999 |
| JP | A 2000-106593 | 4/2000 |

* cited by examiner

*Primary Examiner*—Gerald Gauthier
(74) *Attorney, Agent, or Firm*—Oliff & Berridge, PLC

(57) ABSTRACT

A telephone terminal having a function of telephone communication is provided with a communication recording unit that records the telephone communication as communication data, an interruption controller that controls the communication recording unit to interrupt and to restart recording the telephone communication, the communication recording unit indexing a position, in the communication data, corresponding to the interruption of recording, and a replaying unit that replays the telephone communication as recorded based on the communication data, the replaying unit notifying that the recording was interrupted at the indexed position.

52 Claims, 10 Drawing Sheets

TELEPHONE TERMINAL

BACKGROUND OF THE INVENTION

The present invention relates to a telephone terminal capable of recording a call.

Conventionally, a telephone terminal (e.g., a fixed-line telephone, cell phone, PHS, etc.) capable of recording the call has been known. Typically, in such a telephone terminal, a user operates a predetermined key, the recording is started and stopped.

It sometimes happens that the user holds the telephone call. In such a case, if the recording is kept when the call is being held, a recording space is unnecessarily consumed. Further, when the recorded call is played back, the user must wait for passage of the unnecessarily consumed recording space. In order to avoid such an unnecessary consumption of the recording space, Japanese Utility Model Provisional Publication SHO 60-088658 discloses a telephone terminal in which the recording of the call is stopped when the call is held.

According to the above-indicated publication, the call before and after the interruption is continuously played back without the unnecessary elapsed period during which the call was held.

SUMMARY OF THE INVENTION

When the call is recorded without the interruption corresponding to the period when the call was held, in particular when the user operated to hold the call during he/she was speaking and/or when the user started speaking before he/she released the held condition of the call, the portions before and after the interruption of the recording are awkwardly connected. In such a case, the user may have difficulty in recognizing the interruption of the call, understanding the context of the conversation, and sometimes feel discomfort.

The present invention is advantageous in that the above deficiency can be overcome.

According to an aspect of the invention, there is provided a telephone terminal having a function of telephone communication. The telephone terminal includes a communication recording unit that records the telephone communication as communication data, an interruption controller that controls the communication recording unit to interrupt and to restart recording the telephone communication, the communication recording unit indexing a position, in the communication data, corresponding to the interruption of recording, and a replaying unit that replays the telephone communication as recorded based on the communication data, the replaying unit notifying that the recording was interrupted at the indexed position.

Optionally, the interruption controller may control the communication recording unit to stop recording when a first condition is satisfied, and control the communication recording unit to restart recording when a second condition is satisfied.

Further optionally, the interruption controller may be configured to control the communication recording unit to interrupt and restart the recording of the telephone communication plurality of times during one telephone call. In this case, the communication recording unit may be configured to index a plurality of positions, in the communication data, respectively corresponding to the plurality of interruptions of recording.

Optionally, the telephone communication recording unit may index the interrupted position by inserting predetermined data at the position of the communication data corresponding to the interruption.

In a particular case, the replaying unit may output a predetermined sound at the indexed position of the communication data. Alternatively, the replaying unit may output a predetermined message at the indexed position of the communication data.

Optionally, the telephone terminal may be provided with a data processor that applies a fade-out effect to part of the communication data immediately before the indexed position.

Further optionally, the telephone terminal may be provided with a data processor that applies a fade-in effect to part of the communication data immediately after the indexed position.

Conveniently, the telephone communication recording unit may start and finish recording the telephone communication in response to a predetermined operation by a user.

According to another aspect of the invention, there is provided a telephone terminal having a function of telephone communication. The telephone terminal includes a communication recording unit that records the telephone communication as communication data, an interruption controller that controls the communication recording unit to interrupt and to restart recording the telephone communication, the communication recording unit indexing a position of the communication data corresponding to the interruption of recording, a data controller that controls the communication recording unit to apply a predetermined operation to the communication data in accordance with the indexed position, and a replaying unit that replays the telephone communication data.

Optionally, the predetermined operation includes inserting predetermined data at the indexed position. Alternatively or optionally, the predetermined operation may include modification of the communication data at a portion adjacent to the indexed position.

According to a further aspect of the invention, there is provided a telephone terminal having a function of telephone communication, which includes a recording system that records various data, an audio output system that outputs various audio sounds, a recording control system that controls the recording system to record an audio signal of the telephone communication by a user with a first person as first communication data during a period from a predetermined operation by the user till a predetermined termination condition is satisfied.

The telephone terminal is further provided with a replay control system that controls the audio output system to output the first communication data recorded by the recording system as a voice when operated by the user, and a communication holding system that holds, in response to an operation by the user, the telephone communication of the user with the first person.

The recording system is configured to interrupt the recording of the first communication data during a period, after the recording system was controlled by the recording control system to start recording the first communication data and when the telephone communication with the first person is held by the communication holding system. Further, the replay control system controls the audio output system to output: part of the communication data recorded by the communication recording system and before a position where the recording was interrupted by the instruction of the recording control system as a voice; a notification sound that enables the user to recognize that the telephone communication with the first person has been interrupted; and a remainder of the communication data after the recording was restarted.

According to a furthermore aspect of the invention, there is provided a computer program product including computer readable instructions that causes a computer to function as telephone terminal having a function of telephone communication. The program product causes the computer to record the telephone communication as communication data, to interrupt and restart recording the telephone communication, a position, in the communication data, corresponding to the interruption of recording being indexed, and to replay the telephone communication as recorded based on the communication data, the interruption of recording being notified based on indexing.

According to another aspect of the invention, there is provided a computer program product having computer readable instructions that causes a computer to function as telephone terminal having a function of telephone communication. The program product causes the computer to function to record the telephone communication as communication data, interrupt and restart recording of the telephone communication, the communication recording unit indexing a position of the communication data corresponding to the interruption of recording, apply a predetermined operation to the communication data in accordance with the indexed position, and replay the telephone communication data.

BRIEF DESCRIPTION OF THE ACCOMPANYING DRAWINGS

Figure 5:
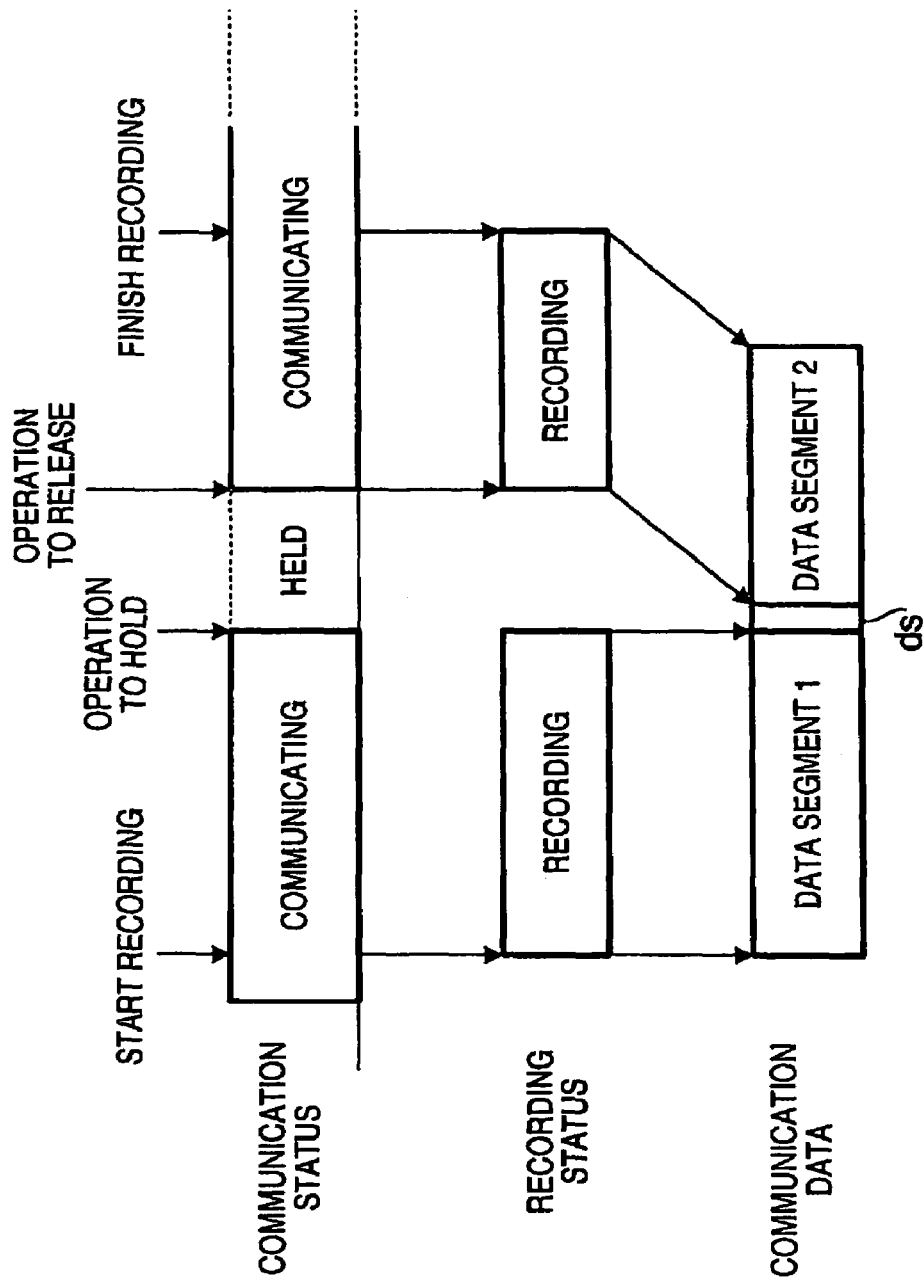
Figure 6:
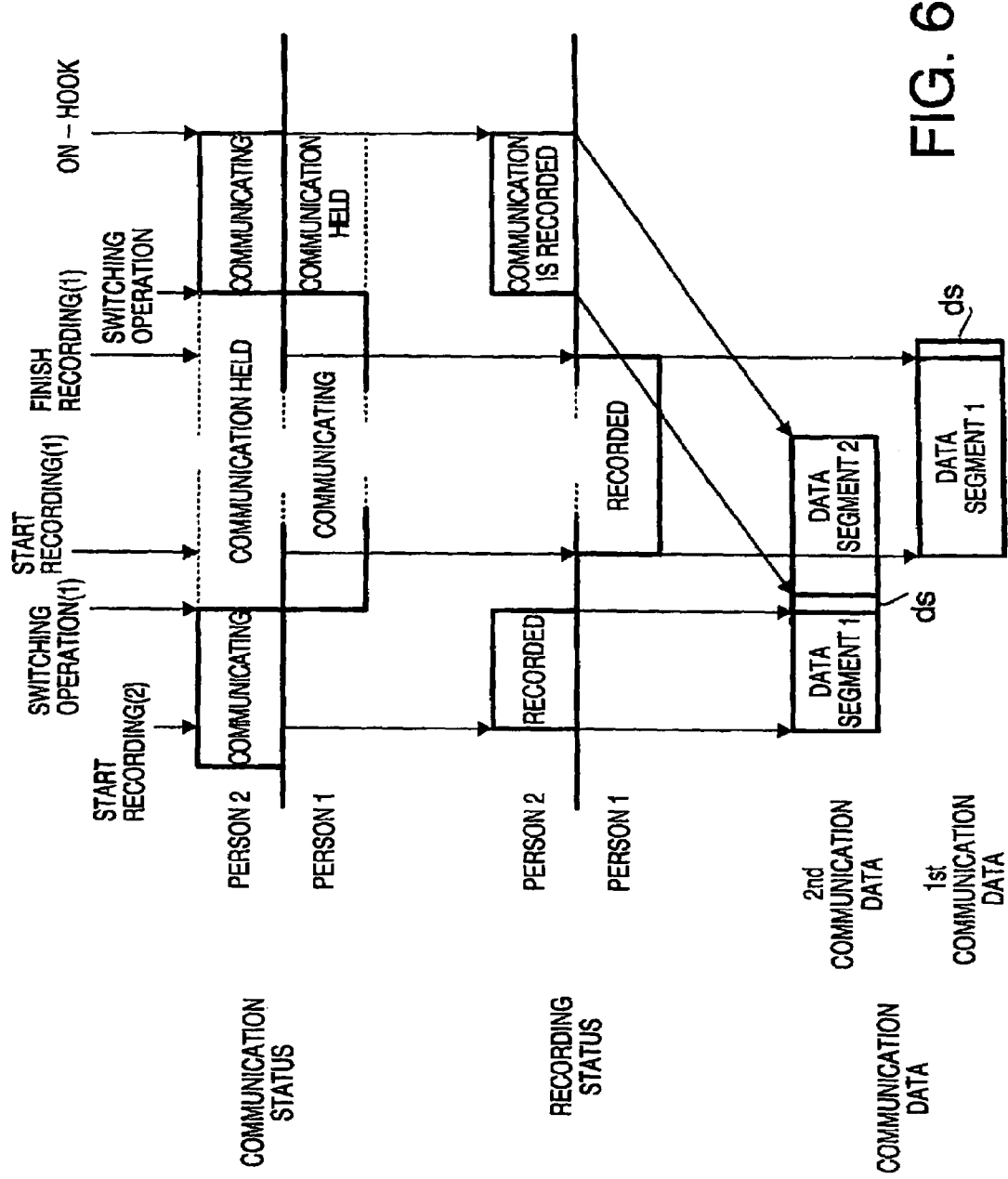
Figure 7:
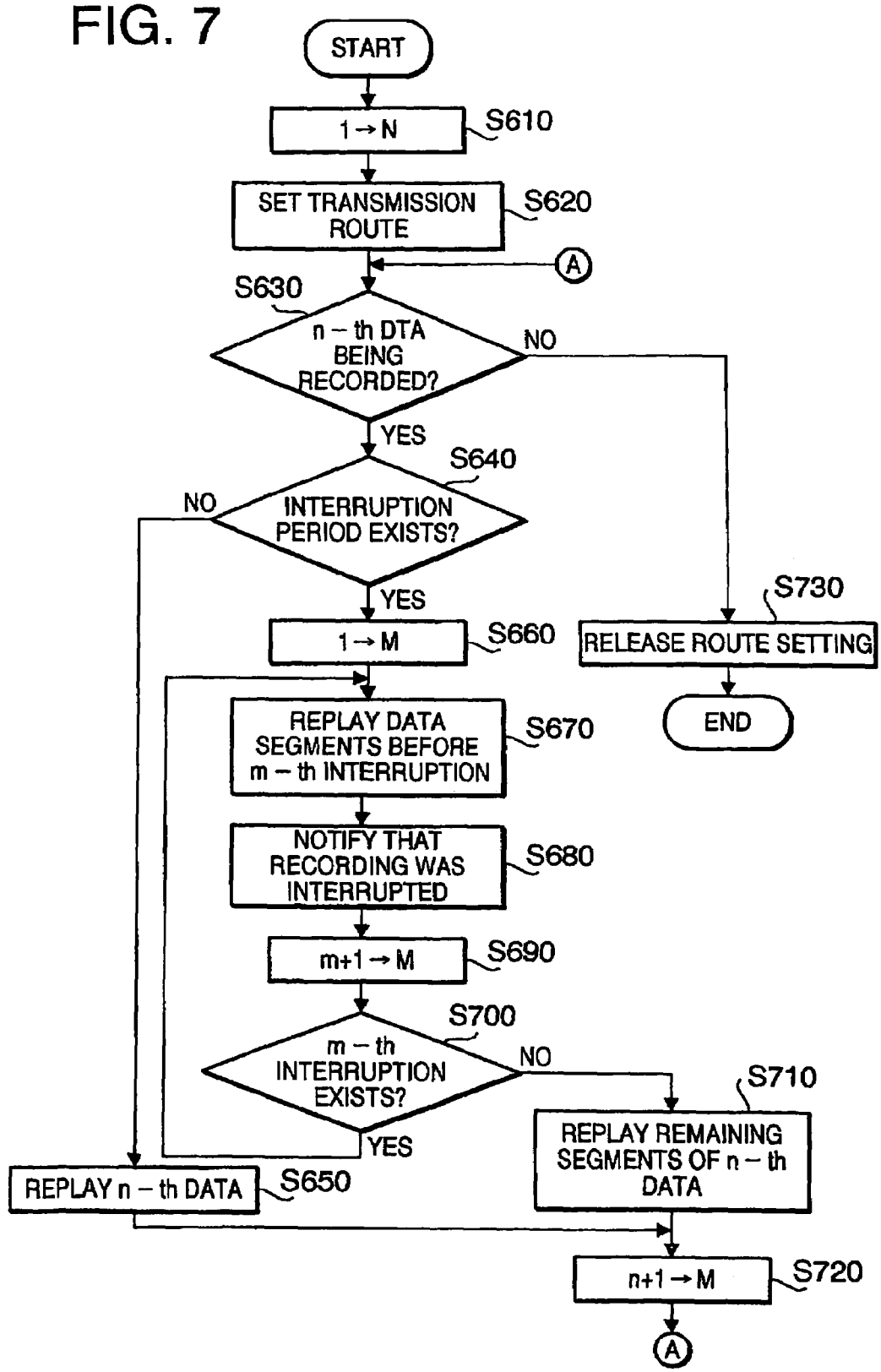
Figure 8:
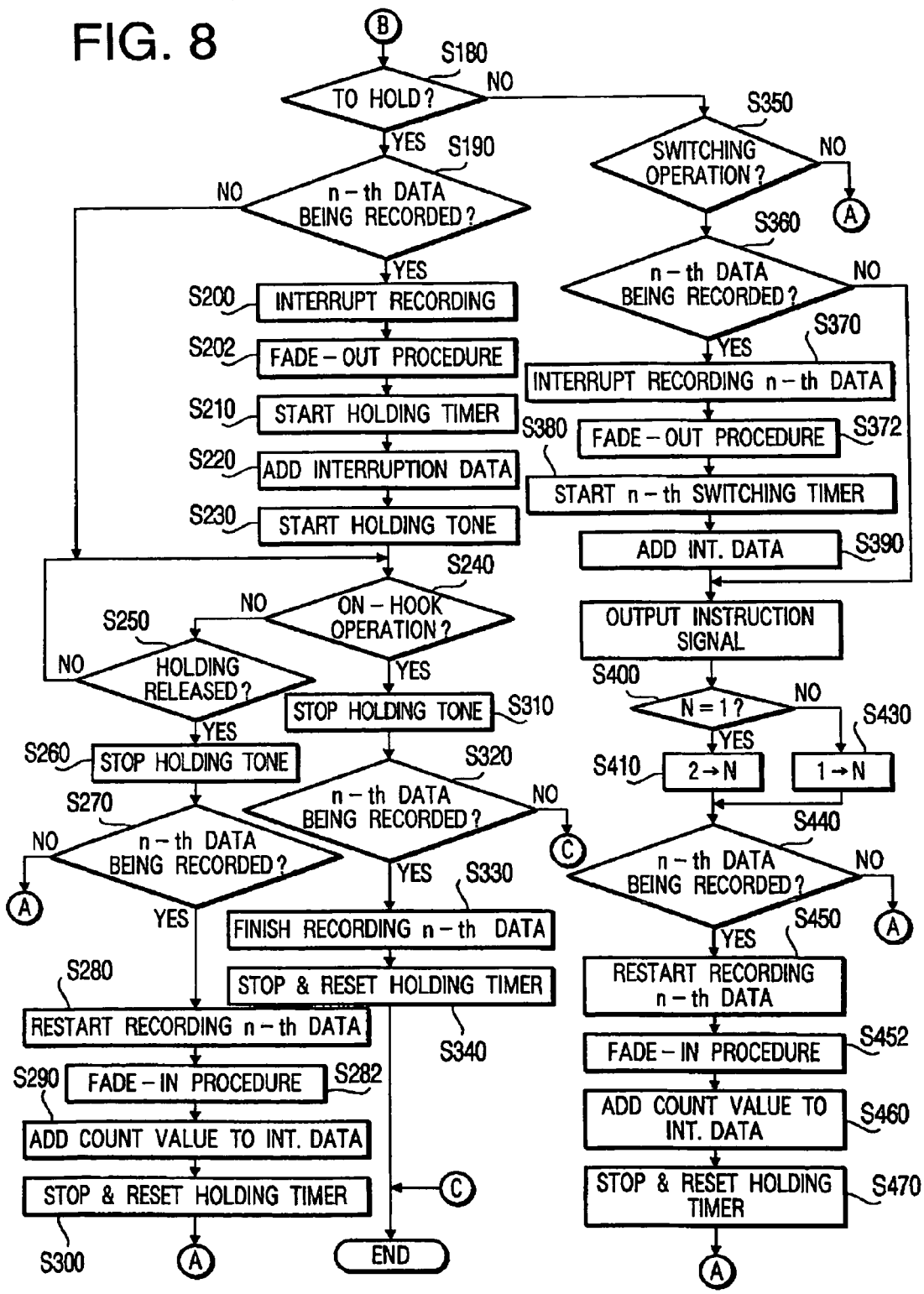
Figure 9:
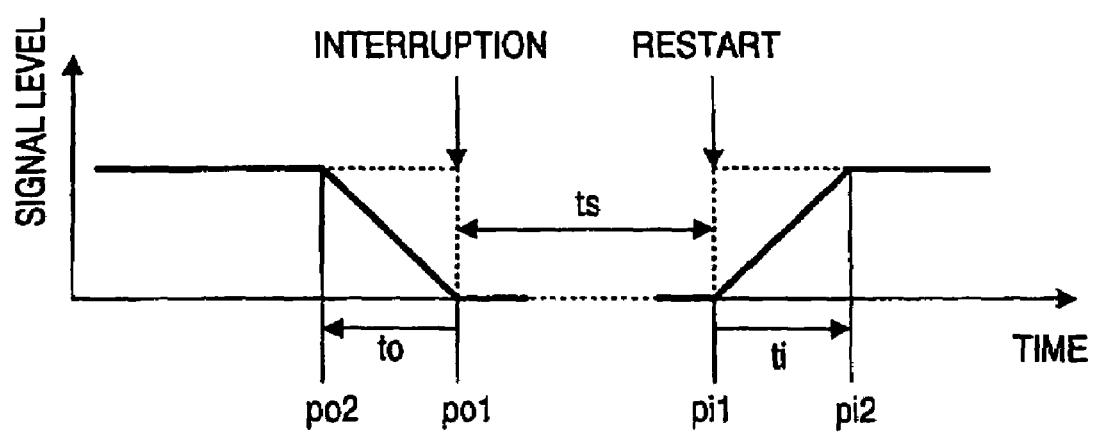
Figure 10:
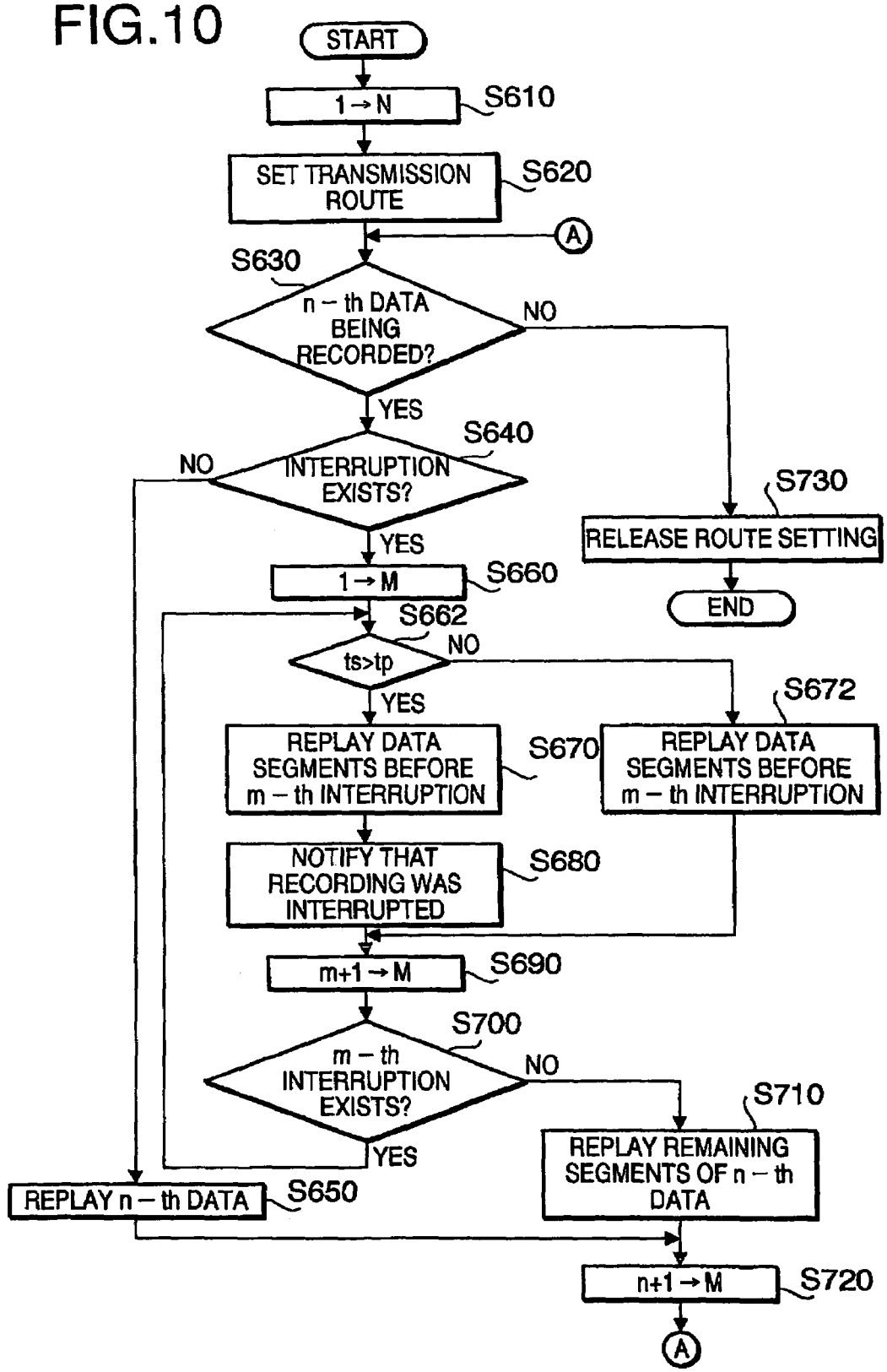

FIG. 5 schematically shows a status of a call, a recording operation and recorded data;

FIG. 6 schematically shows another example of a status of a call, a recording operation and recorded data;

FIG. 7 is a flowchart illustrating a playback procedure according to the first embodiment;

FIG. 8 shows a part of a telephone communication procedure according to a second embodiment of the invention;

FIG. 9 schematically shows an example of recorded data to which fade-out and fade-in processes have been applied; and FIG. 10 is a flowchart illustrating a playback procedure according to a modification of the first embodiment.

DESCRIPTION OF THE EMBODIMENTS

Referring to the accompanying drawings, an multi function peripheral according to the embodiments of the invention will be described.

Figure 1:
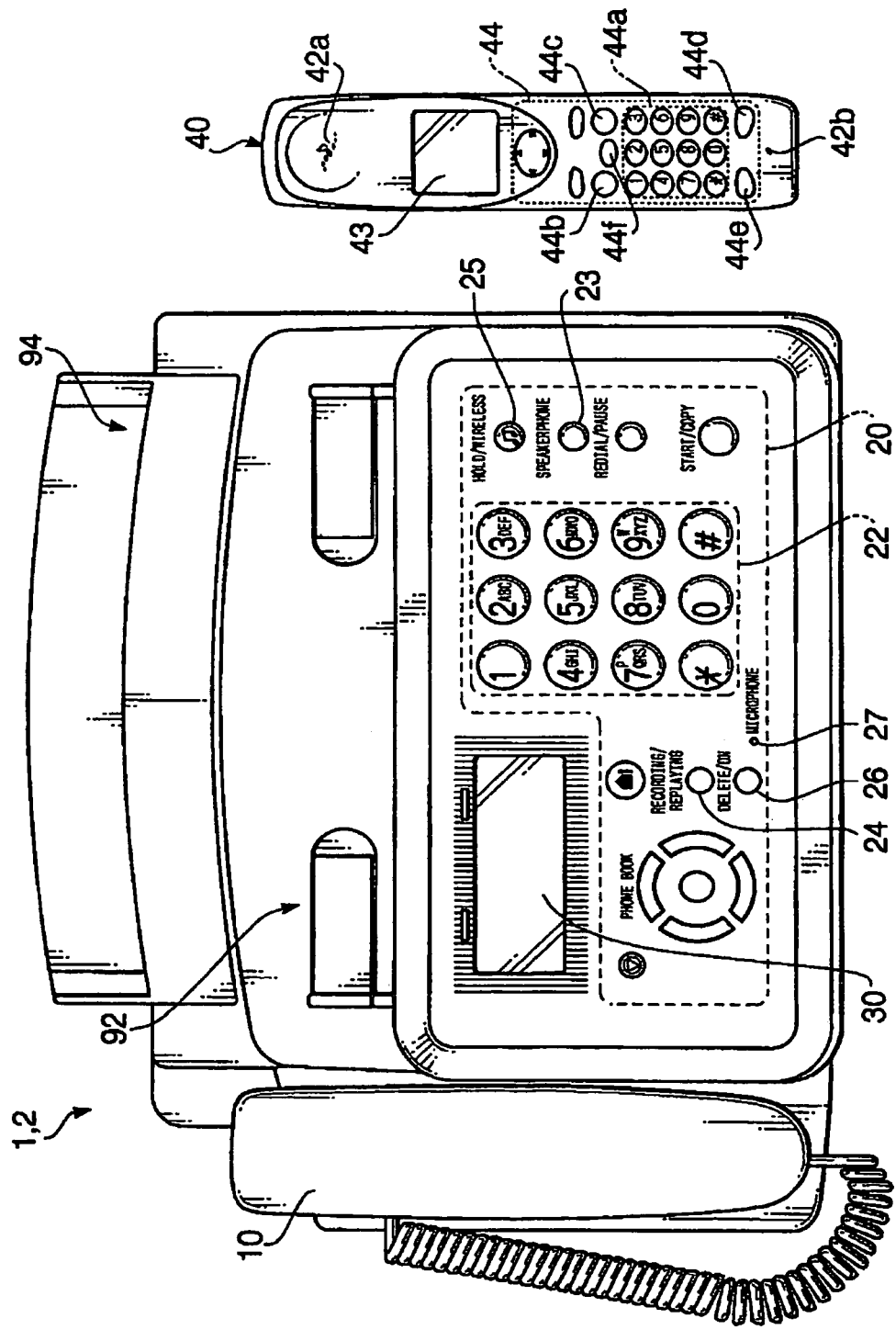
FIG. 1 shows an appearance of an MFP (multi function peripheral) according to the invention.

FIG. 1 shows an appearance of an MFP (multi function peripheral) 1 to which the invention can be applied. The MFP 1 has functions of telephone terminal, facsimile device, copier and scanner. The MFP 1 is provided with a handset 10 arranged on a side portion of a main body of the MFP 1, an operation panel 20 and a display panel 30 arranged on an upper surface of the main body, and a cordless handset 40.

Figure 2:
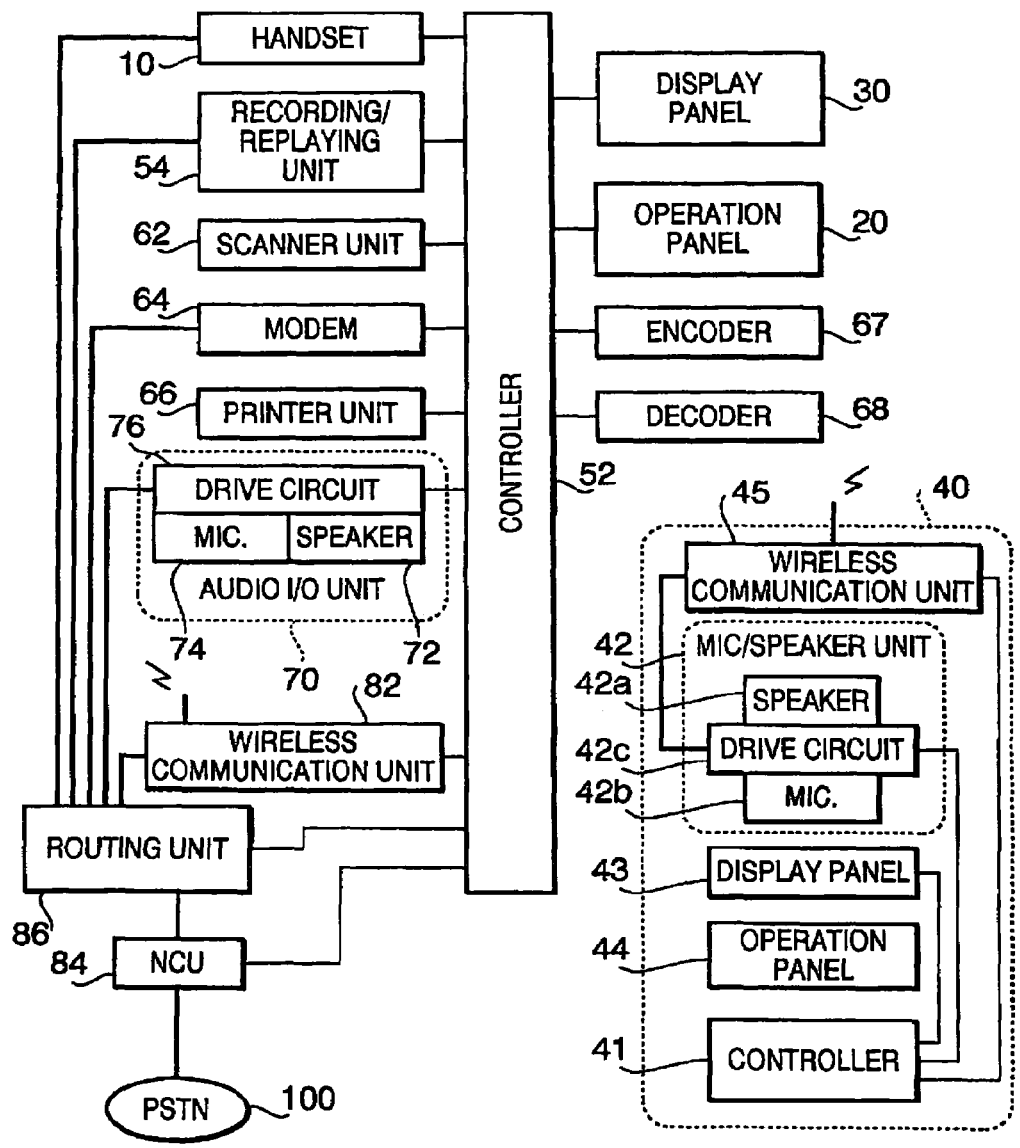
FIG. 2 is a block diagram illustrating an electrical configuration of the MFP shown in FIG. 1.

FIG. 2 is a block diagram illustrating an electrical configuration of the MFP 1 shown in FIG. 1. The MFP 1 includes a controller 52, a recording/replaying unit 54, a scanner unit 62, a modem 64, a printer unit 66, an encoder 67, a decoder 68, an audio input/output unit 70, a wireless communication unit 82, an NCU (network control unit) 84, a routing unit 86, which are provided as built-in units.

The handset 10 is a device including microphone and receiver. The handset 10 is picked up when it is used. The operation panel 20 includes a plurality of keys 22 for inputting letters, numbers, characters and symbols, a speaker phone button 23 to be operated when a handsfree call is performed with use of the audio input/output unit 70, a recording/replaying button 24, a holding/wireless handset button 25, a deletion/catch button 26.

The wireless handset 40 includes a controller 41, a microphone/speaker unit 42, a display panel 43, an operation panel 44 and a wireless communication unit 45.

The controller 41 executes a program stored in a memory provided therein and control the operation of the wireless handset 41 by transmitting instructions to respective components of the wireless handset 40.

The microphone/speaker unit 42 includes a driving circuit 42c for driving a speaker 42a and a microphone 42b which are also included therein.

The operation panel 44 includes a plurality of input keys 44a for inputting letters, numbers, characters and symbols, an outside call button 44b to be operated to start a wireless communication with the main body, a disconnect button 44c to be operated to terminate the outside call. The keys 44a further includes a catch button 44d, a record button 44e and a hold button 44f.

The wireless communication unit 45 enables a wireless communication with the main body of the MFP 1 by transmitting/receiving signals including an audio signal to/from the wireless communication unit 82 of the main body of the MFP 1.

When the operation panel 44 of the wireless handset 40 is operated, a control signal corresponding to the operation is transmitted to the wireless communication unit 82. The controller 52 recognizes the operation using the operation panel in accordance with the control signal as transmitted.

The control unit 52 executes programs stored in a memory thereof and controls the operation of the MFP 1 by transmitting instructions to respective components of the MFP 1.

The recording/replaying unit 54, in response to suitable instructions transmitted from the controller 52, records an audio signal input through the routing unit 86 and outputs recorded audio signals through the routing unit 86 (i.e., replays the recorded audio signals).

The scanner unit 62, in response to an instruction transmitted from the controller 52, scan an image of an original sheet placed at a reading position 92, and generates image data of the scanned image. The image data is converted into an image signal which can be transmitted through a PSTN (Public Switched Telephone Network) 100 as encoded by the encoder 67 and modulated by the modem 64, and is transmitted to the routing unit 86.

The printer unit 66 prints an image, under control of the controller 52, onto recording sheet set at a sheet feeding position 94 (see FIG. 1) in accordance with image data. The image data subject to be printed may be generated such that, for example, an image signal is received from the PSTN 100 through the routing unit 86 and the NCU 84, demodulated by the modem 64, and decoded by the decoder 68.

The audio input/output unit 70 includes a drive circuit 76 for driving a speaker 72 and a microphone 74. The speaker 72 is used for outputting various audio signals. Further, by controlling the speaker 72 and the microphone 74 to operate as ones for telephone communication, the handsfree call can be realized. The microphone 74 is arranged on an inner surface of a portion of the operation panel 20 where a hole 27 is formed. Through the hole 27, the audio wave propagates to the microphone 74.

The wireless communication unit 82 transmits/receives wireless signals carrying various signals including the audio signal to/from the wireless communication unit 45 of the wireless handset 40 to realize the wireless communication.

The NCU 84 interfaces the input/output of signals with respect to the PSTN 100.

The routing unit 86 functions, under control of the controller 52, such that, when an off-hook operation (i.e., an operation for stating a telephone call) is performed at one of the handset 10, the audio input/output unit 70 and the wireless handset 40 (which will be simply referred to as a handset), the routing unit 86 sets the operated handset as a destination of the audio signal transmitted from the NCU 84 and an origin of the audio signal from which the audio signal is transmitted to the NCU 84. The thus determined handset will be simply referred to as an active handset hereinafter.

Specifically, when the handset 10 is picked up from the main body of the MFP 1, the handset 10 is determined as the active handset; when the speaker phone button 23 is depressed, the audio input/output unit 70 is determined as the active handset; and when the outside-line button 44b of the wireless handset 40 is depressed, the wireless handset 40 is determined as the active handset. As above, the routing unit 86 establishes a route between the NCU 84 and the active handset.

Further, the routing unit 86 functions, under control of the controller 52, to release the active handset (i.e., inactivate the active handset) when an off-hook operation (i.e., an operation for terminating the call) is performed at the active handset. Specifically, the when the handset 10 (currently active) is placed on the main body of the MFP 1, the handset 10 becomes inactive; when the audio input/output unit 70 is active and the speaker phone button 23 is depressed, the audio input/output unit 70 becomes inactive; and when the wireless handset 40 active and the disconnect button 44c is depressed, the wireless handset 40 becomes inactive.

As above, after the off-hook operation is performed, no audio signal is transmitted between the NCU 84 and the inactive handset.

Figure 3:
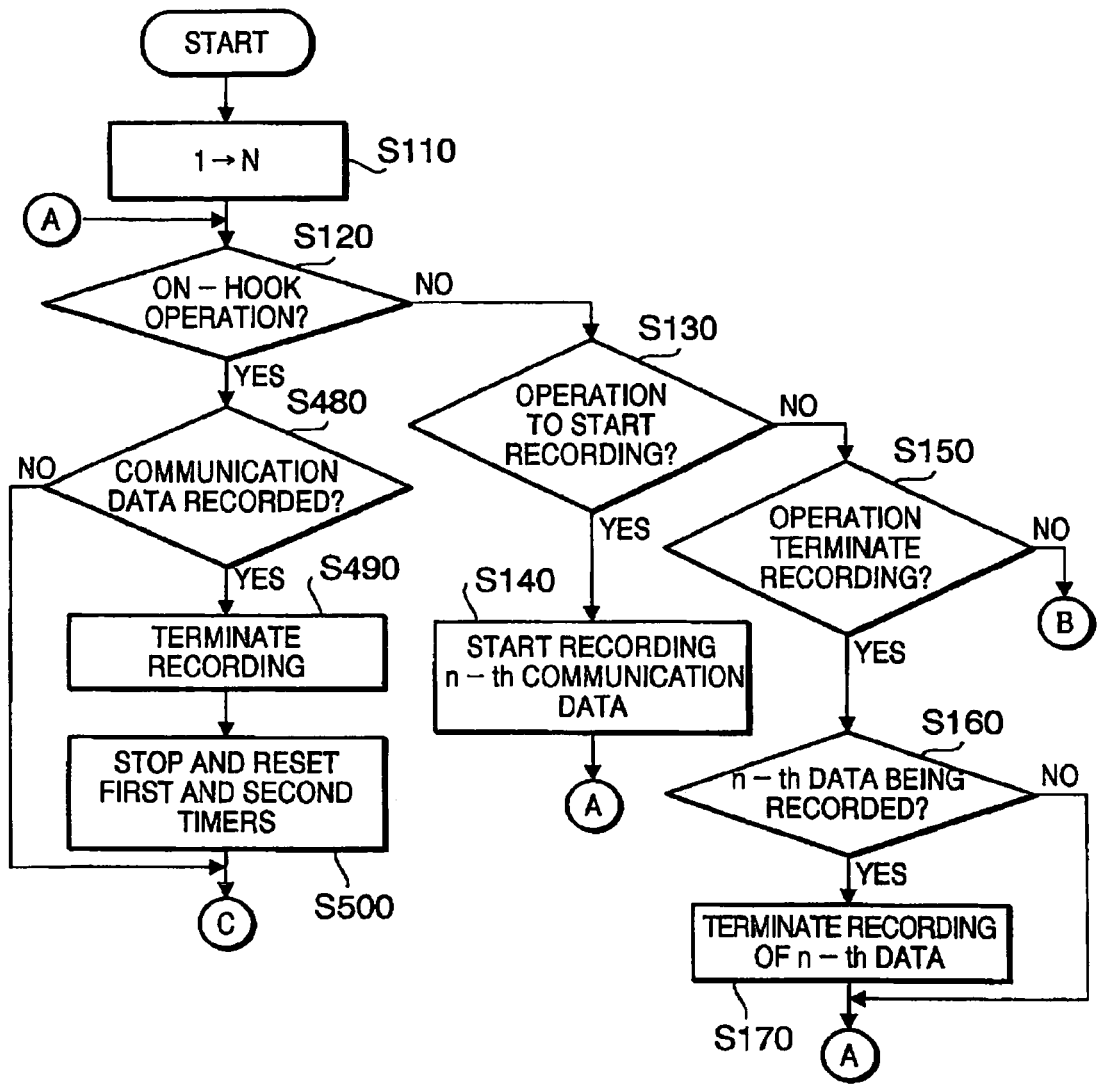
FIGS. 3 and 4 show a flowchart illustrating a telephone communication procedure according to a first embodiment of the invention.
Figure 4:
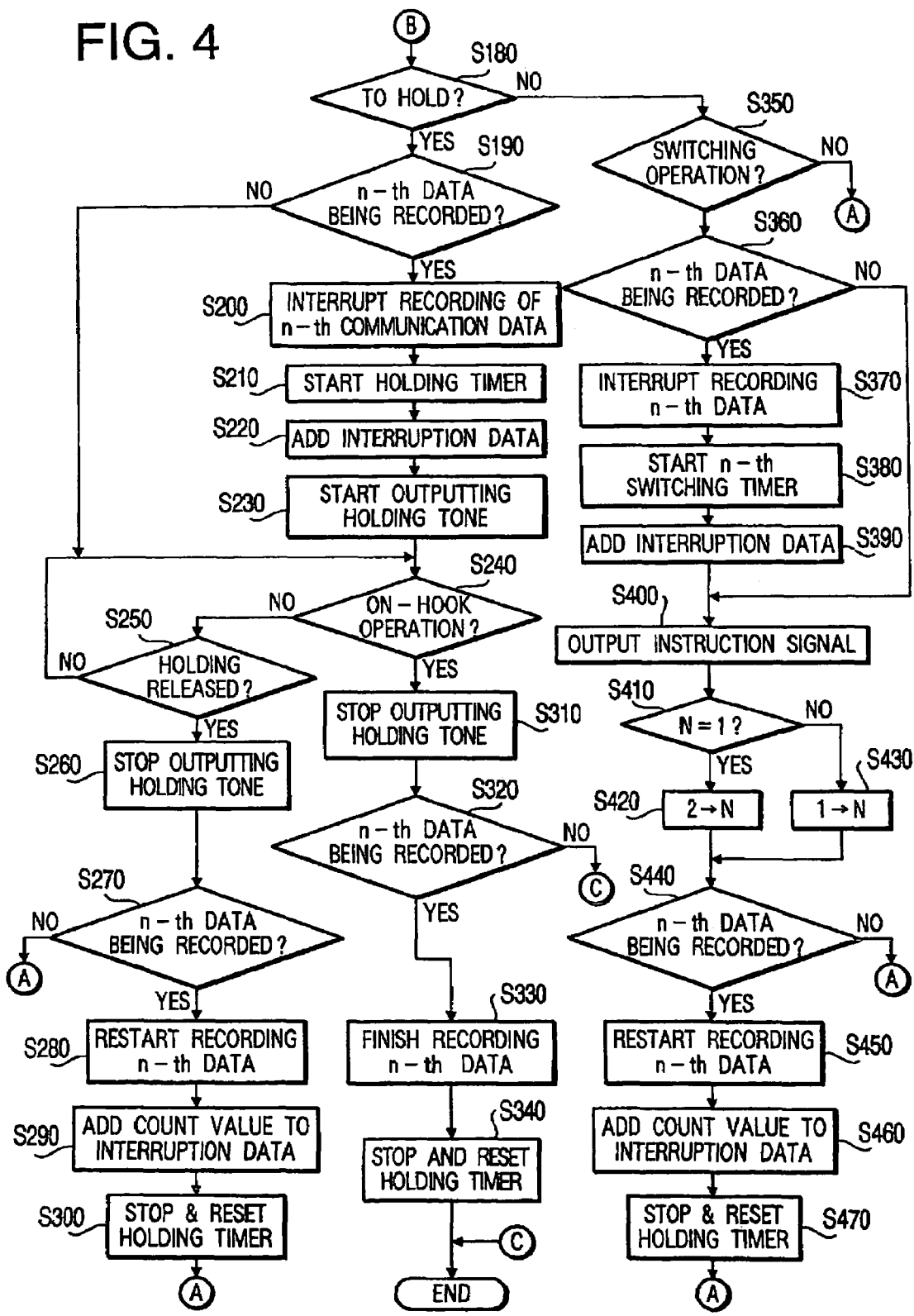

FIGS. 3 and 4 show a flowchart illustrating the telephone communication procedure according to a first embodiment of the invention. The telephone communication procedure is executed by the controller 52 when the off-hook operation is performed and the handset becomes active.

When the off-hook operation is for receiving a call through the PSTN 100, the handset received the call is active. When the off-hook operation is for initiating a call, the handset becomes active after a further operation to call a destination and the call is received by the destination.

When the telephone communication procedure starts, a variable N is set to one (S110). For the sake of convenience, in the following description, n represents a value set to the variable N. Therefore, when step S110 is executed, n=1.

In S120, the controller 52 determines whether the on-hook operation is performed with the active handset. When the on-hook operation is not performed (S120: NO), an operation for recording the call (telephone communication) is performed (S130). The operation for recording the call is: when the active handset is the handset 10 or the audio input/output unit 70, to depress the recording/replaying button 24; and when the wireless handset 40 is the active handset, an operation to depress the record button 40e.

When the operation for recording the call is performed (S130: YES), the controller 52 starts recoding the communication as n-th data (S140).

Specifically, when the recording is started, the controller 52 controls the routing unit 86 to establish another route for transmitting the audio signal output by the NCU 84 to the recording/replaying unit 54, and a further route for transmitting the audio signal output by the active handset to the recording/replaying unit 54, with maintaining the route between the NCU 84 and the active handset. With this control, the audio signals from the active handset (user) and the NCU 84 (i.e., from a calling person who makes the call, or an objective person to whom the call is made) are transmitted to the recording/replaying unit 54.

Under this condition, the recording/replaying unit 54 is controlled to record the audio signals representing the telephone communication as the n-th communication data (cf. "start of recording" in FIGS. 5A-5C and 6A-6C). Until the recording is terminated (in S170, S330 or S490), the recording is kept, and data size (i.e., quantity of data) of the n-th data increases in accordance with a time duration of the telephone communication. After the recording is started (S140), control returns to S120.

When the operation for starting the recording is not performed (S130: NO), the controller 52 determines whether an operation for terminating the recording is performed (S150). The operation for terminating the recording is: to depress the recording/replaying button 24 when the recording was started as the recording/replaying button 24 was depressed; and to depressing the record button 44e when the recording was started as the record button 44e was depressed.

When the operation for terminating the recording is performed (S150: YES), the controller 52 determines whether the n-th data is being recorded (S160). It should be noted that, when the recording of the n-th data started in S140 is being executed or interrupted (cf. S370), the controller 52 determines that the recording of the n-th data is being executed.

When the controller determines that the n-th data is being recorded (S160: YES), as the operation for terminating the recording is performed, the controller 52 finishes the recording of the n-th data (S170).

In S170, the controller 52 controls the recording/replaying unit 54 to finish the recording of the audio signals transmitted from the NCU 84 and the active handset. Next, the controller 52 assigns serial number data indicative of a serial number following the numbers corresponding to the communication data previously recorded. Thereafter, the controller 52 controls the routing unit 86 to release the route connecting the NCU 84 and the recording/replaying unit 54 and the route connecting the active handset and the recording/replaying unit 54. With this control, the telephone communication is maintained, while the audio signals will not be transmitted to the recording/replaying unit 54.

After the recoding is fished (S170) or when the n-th communication data is not recorded (S160: NO), control returns to S120.

When the controller 52 determines, in S150, that the operation for terminating the recording is not performed (S150: NO), the controller 52 determines whether the operation to hold the telephone call is performed (FIG. 4; S180).

The operation to hold the telephone call (which will be occasionally referred to as a holding operation) is an operation for temporarily disabling the telephone communication without disconnecting the line. The holding operation is: to depress the hold/wireless handset button 25 of the operation panel 20 when the handset 10 or the audio input/output unit 70 is active; and to depress the hold button 44f of the operation panel 44 when the wireless handset 40 is active.

When the holding operation is performed (S180: YES), the controller 52 determines whether the n-th communication data is being recorded (S190). Similar to step S160, when the recording of the n-th data started in S140 is being executed or interrupted (cf. S370), the controller 52 determines that the recording of the n-th data is being executed.

When the n-th communication data is being recorded (S190: YES), the controller 52 controls the recording/replaying unit 54 to interrupt the recording of the audio signals (S200). It should be noted that the recoding of the n-th data is not finished at this stage (cf. holding operation in FIGS. 5A-5C).

In S210, the controller 52 starts a holding duration timer to measure the duration during which the telephone call is held. In S220, the controller 52 adds interruption data ds to the n-th communication data recording of which is currently interrupted. The interruption data ds is data to be used for identifying that the recording is interrupted due to the holding operation, and for identifying a portion where the recording is interrupted. Accordingly, the size (i.e., quantity) of the interruption data ds is very small in comparison with a case where an audio signal indicating the interruption of the recording is stored as such data (cf. data ds in FIG. 5C).

In S230, the controller 52 starts outputting holding sound (S230). Specifically, the controller 52 controls the routing unit 86 to release the route connecting the NCU 84 with the active handset. Then, the controller 54 controls the recording/replaying unit 54 to start replaying a audio signal (i.e., replaying the holding sound) which has been stored therein in advance. With this control, the holding sound replayed by the recording/replaying unit 54 is transmitted to the calling or objective person.

After step S230 is executed, or when the n-th communication data is not being recorded (S190: NO), the controller 52 determines whether the on-hook operation is performed (S240).

When the controller 52 determines that the on-hook operation is not performed (S240: NO), the controller 52 determines whether the operation for releasing a holding condition is performed (S250). The operation for releasing the holding condition is: to depress the hold/wireless handset button 45 when the telephone call has been held by operating the hold/wireless handset button 25 in S180; and to depress the hold button 44f when the telephone call has been held by depressing the hold button 44f in S180.

When the operation for releasing the holding condition is not performed (S250: NO), control returns to S240. When the operation for releasing the holding condition is performed (S250: YES), in S260, the controller 52 controls the recording/replaying unit 54 to stop replaying the audio signals which was started in S230. In step S260, the controller 52 controls the recording/replaying unit 54 to stop outputting the audio signal of the holding sound. Then, the controller 52 controls the routing unit 86 to set a route connecting the NCU 84 with the active handset for exchanging the audio signals. With this control, the telephone call between the user and the calling/objective person becomes available again.

In S270, the controller 52 determines whether the n-th data is being recorded (S270). This step is similar to S160 or S190 described above.

When the n-th communication data is being recorded (S270: YES), the recording of the n-th communication data, which has been temporarily interrupted, is restarted (S280). In S280, the controller 52 controls the recording/replaying unit 54 to restart recording the audio signals transmitted from the NCU 84 and the active handset (cf. release holding condition of FIGS. 5A-5C).

Then, in S290, the controller 52 controls the recording/replaying unit 54 to add the value of the holding timer (i.e., the counted value thereof) to the interruption data ds. With this control, it becomes possible to identify a duration of the interruption (i.e., the holding condition of the telephone call) by referring to the interruption data ds.

Next, the controller 52 stops the holding timer, which was started in S220, and resets the holding timer (S300). After step S300 is executed, or when the n-th communication data is not being recorded (S270: NO), control returns to S120.

When, in S240, the on-hook operation is performed (S240: YES), the controller 52 stops, in S310, the output of the holding sound, which was started in S230.

Next, the controller 52 determines whether the n-th communication data is being recorded (S320), which is similar to steps S160, S190 and S270.

When the n-th communication data is being recorded (S320: YES), the recording of the telephone call as the n-th communication data is finished (S330). In S330, similar to step S170, the controller 52 controls the recording/replaying unit 54 to finish recording the audio signals (cf. end of recording in FIGS. 5A-5C). Next, the controller 52 relates the serial number mentioned above with the communication data created by the execution of S330. Then, the controller 52 controls the routing unit 86 to release the routes respectively connecting the NCU 84 and the active handset with the recording/replaying unit 54.

In S340, the controller 52 stops and resets the holding timer which was started in S210. This step is similar to S300 described above.

After execution of S340, or when the n-th communication data is not being recorded (S320: NO), the controller 52 finishes the telephone communication procedure shown in FIGS. 3 and 4.

When the controller 52 determines that the holding operation is not performed (S180: NO), the controller 52 determines whether an operation for switching the calling/objective person (hereinafter, simply referred to as a switching operation) is performed in S350. The switching operation is an operation for using a call-waiting (CW) function, which enables the user to receive another calling person with holding the call with the first calling/objective person, when a new call comes in from the second calling person during the telephone call with the first calling/objective person. Specifically, the switching operation is: to depress the delete/CW button 26 when the first call was started by the off-hook operation for the handset 10 or the audio input/output unit 70; and to depress the CW button when the first call was started by the off-hook operation for the wireless handset 40.

The CW function is provided by an administrator of the PSNT 100.

When the switching operation is not performed (S350: NO), control returns to S120. When the switching operation is performed (S350: YES), the controller 52 determines whether the recording of the n-th data is executed (S360). Step S360 is similar to step S160, S190, S270 and S320.

When the recording of the n-th communication data is executed (S360: YES), the controller 52 interrupts (i.e., temporarily stops) the recording of the n-th communication data (S370). In S370, similar to S200, the recording of the audio signals from the NCU 84 and the active handset is temporarily stopped (cf. switching operation in FIGS. 6A-6C).

Next, the controller 52 starts counting by an n-th switching timer to count the duration of a switching time during which the telephone communication with the second calling person is performed (S380). Then, the controller 52 adds the interruption data ds indicative of the interruption of the recording to the n-th communication data (S390). The interruption data ds is data for indicating the recording is interrupted due to the switching operation and for identifying the portion where the recording is interrupted. Thus, similarly to the data added in S220, the data size of the interruption data ds is very small (cf. the interruption data ds in FIG. 6C).

After step S390 is executed, or when the n-th communication data is not being recorded (S360: NO), the controller 52 transmits an instruction signal for switching the calling/objective person to the PSNT 100 through the NCU 84 (S400).

In S410, the controller 52 checks the value n of the variable N. When n=1 (S410: YES), the controller 52 sets the variable N to two (i.e., n=2) in S420. When n=2 (S410: NO), the controller 52 sets the variable N to one (i.e., n=1) in S430.

After step S420 or S430 is executed, the controller 52 determines whether the n-th communication data is being recorded (S440). This step is similar to step S160, S190, S270, S320 or S360. That is, the controller 52 determines whether the telephone communication with the switched calling/objective person is being recorded. In FIGS. 6A-6C, after the "start recording (2)", the telephone communication with the second person is recorded.

When the n-th communication data is being recorded (S440: YES), the recording of the telephone communication that was interrupted in S370 is restarted as the recording of the n-th communication data (S450). This step is similar to S280 (cf. switching operation (2) in FIGS. 5A-5C).

Next, in S460, the controller 52 adds the count value of the n-th switching timer to the interruption data ds which was added to the n-th communication data in S390. In S460, similar to S290, the interruption data ds is updated by adding the count value of the n-th switching timer to the interruption data ds so that the interrupted time duration can be identified with reference to the interruption data ds.

In S470, the controller 52 stops and resets the n-th switching timer which was started in S380.

After execution of S470, or when the n-th communication data is not being recorded (S440: NO), control returns to S120.

Thereafter, steps from S120 to S470 are repeated. When the operation for terminating the recording of the telephone communication is performed (S150: YES), the recording of the telephone communication as the n-th data is finished in S170 (cf. end of recording (1) in FIGS. 6A-6C).

When the on-hook operation is performed (S120: YES), the controller 52 determines whether the recording of the telephone communication data (first and second communication data) is being recorded (interrupted) or not (S480). Similar to S160, S190, S270, S320 or S360, when one of the first communication data and second communication data is being recorded or interrupted, the controller 52 determines that the communication data is being recorded. In FIGS. 6A-6C, a case where step S120 is executed after the calling/objective person was switched in the steps after S350 by the switching operation (2).

Next, in S490, the controller 52 finishes recording the telephone communication as the communication data. This step is similar to S330, and the controller 52 controls the recording/replaying unit 54 to finish the recording of each of the first communication data and the second communication data (cf. on-hook in FIGS. 6A-6C). The, to each of the communication data created before execution of S490, the above-described serial numbers are assigned. Then, the controller 52 controls the routing unit 86 to release the setting of the routes connecting the NCU 84 and the active handset with the recording/replaying unit 54.

In S500, the controller 52 stops and resets the first and second switching timers which were started in S380, and finishes the procedure shown in FIGS. 3 and 4.

FIG. 7 is a flowchart illustrating a playback procedure according to the first embodiment.

The playback procedure shown in FIG. 7 is executed by the controller 52 when the telephone communication is not currently performed and the record/replay button 24 of the operation panel 20 is depressed.

In S610, the controller 52 initializes the variable N. In this initialization, the variable N is set to one (i.e., n=1). Next, the controller 52 controls the routing unit 86 to establish a transmission route so that the audio input/output unit 70 is set as a destination of the audio signal output by the recording/replaying unit 54 (S620).

In S630, the controller 52 determines whether the n-th communication data has been recorded in the recording/replaying unit 54. In step S630, when the controller 52 detects, among the data stored in the recording/replaying unit 54, the communication data assigned with the serial number represented by the serial number data corresponding to the communication data is n, the controller 52 determines that the n-th communication data has been recorded.

In step S630, when the n-th communication data is recorded in the recording/replaying unit 54 (S630: YES), the controller 52 determines whether the data includes the interrupted period (S640). Specifically, in S640, the controller 52 determines that the data includes the interrupted period when the n-th communication data has been added with the interruption data and the data includes a data area after the portion indicated by the interruption data (see second communication data in FIG. 6C).

When the n-th communication data does not include the interrupted period (S640: NO), the controller 52 controls the recording/replaying unit 54 to play back the telephone communication represented by the n-th communication data (S650) Specifically, in step S650, the controller 52 controls the recording/replaying unit 50 to replay the n-th communication data over the entire recording area. With this control, the telephone communication represented by the n-th communication data which is replayed by the recording/replaying unit 54 is output by the audio input/output unit 70 as replayed voice.

When the n-th communication data include the interrupted period (S640: YES), the controller 52 initializes a variable M (S660) Specifically, the variable M is set to one. In the following description, the value of the variable M is represented by m.

Next, the controller 52 controls the recording/replaying unit 54 to replay an data area before the m-th interrupted point of the n-th communication data (S670). In S670, the controller 52 regards the communication data as data consists of a plurality data segments delimited by the one or more positions respectively represented by one or more pieces of the interruption data ds. Then, the controller 52 controls the recording/replaying unit 54 to replay the data segment immediately before the m-th (counted from the top) interruption data (see data segment 1 of FIGS. 5A-5C and 6A-6C). With this control, the telephone communication represented by the m-th data segment of the n-th communication data is output by the audio input/output unit 70 as the replayed voice.

After the output of the telephone communication (S670), the controller 52 controls the recording/replaying unit 54 to notify that the telephone communication was interrupted (S680). Specifically, when a condition that the recording was interrupted by the holding operation is identified by the m-th interruption data, a message is generated by inserting the interrupted period identified by the m-th interruption data in one of voice messages stored in the recording/replaying unit 54 and indicating that the recording was interrupted by the holding operation, and outputs the thus created message as a voice message.

When the m-th interruption data indicates that the recording was interrupted by the switching operation, a message is generated by inserting the interrupted period identified by the m-th interruption data in one of the voice messages stored in the recording/replaying unit 54 and indicating that the recording was interrupted by the switching operation, and outputs the thus created message as a voice message.

It should be noted that the recording/replaying unit stores voice data of the numbers and units (hour(s), minute(s) and second(s)) for outputting the interrupted period. Based on the m-th interruption data, a voice message of the interruption period is generated by combining the data of the numbers and units described above and inserted in the message indicating the recording was interrupted by the holding (switching) operation, which is replayed by the recording/replaying unit 54 and is output by the audio input/output unit 70 as a voice message.

Next, a value one is added to the variable M (i.e., m is incremented by one) in S690.

In S700, the controller 52 determines whether the n-th communication data has the m-th interrupted point. In S700, the controller 52 determines that the m-th interrupted point exists when there is m-th interruption data (counted from the top of the n-th communication data) and there exists data segment after the segment identified by the m-th interruption data.

When the controller 52 determines that there exists the m-th interruption point (S700: YES), the controller 52 waits for the notification (i.e., replay of the message) in S680, and then returns to S670.

When the controller 52 determines that the n-th communication data does not include the m-th interruption data (S700: NO), the controller 52 controls the recording/replaying unit 54 to replay the remaining segment of the n-th communication data (S710). Specifically, in S710, the controller 52 controls the recoding/replaying unit 54 to replay (m-1)th data segment (cf. data segment 2 in FIGS. 6A-6C). With this control, the remaining portion of the n-th communication data is replayed by the recording/replaying unit 70.

After the replay of the recorded communication is finished in S710 or in S650, the controller 52 increments the variable N by one (i.e., n=n+1) in S720, and control returns to S630.

As above, by repeating steps S630-S720, the communication data as recorded is replayed sequentially by the recording/replaying unit 54. As the replay is continued, the controller 52 determines that n-th data is not recorded in the recording/replaying unit 54 (S630: NO). Then, the controller 54 controls the routing unit 86 to release the transmission route connecting the recording/replaying unit 54 and the audio input/output unit 70 (S730), and finishes the playback procedure.

According to the MFP 1 configured as above, when the communication data is output as a voice message, firstly a portion before the telephone communication is interrupted is replayed, then, notifying a listener (the user) that the communication was interrupted. Thereafter, the following part of the communication data is replayed. By notifying the user of the interruption, the user can easily recognize that there was an interruption, and understands the discontinuity of the portions before and after the interruption, which reduces the discomfort due to unnatural sounds and/or the discontinuity of the voice messages.

In steps S180 or S250 of FIG. 4, by performing the operation for holding the telephone communication or the operation for releasing the holding condition, the telephone communication with the calling/objective person is interrupted or restarted.

By steps S350 onwards (FIG. 4), the CW function can be used. In this case, if the telephone communication with the first person is recorded, when the telephone communication with the first person is held during the communication with the first person and activate the telephone communication with a second person, the recording of the telephone communication is automatically interrupted in S370 of FIG. 4. It is unnecessary for the user to perform an operation therefor. Further, if the user intends to record the telephone communication with the second person, it can be recorded, as second data, separately from the communication data (i.e., the first data) for the first person. Thus, in the playback procedure in FIG. 7, the first data and the second data can be output as different voice messages.

In S680 of FIG. 7, the interrupted duration, which can be identified with reference to the interruption data, can be notified to the user by voice. With this notification, the time duration during which the telephone communication is held or switched to another call can be notified to the user at a timing same as the interruption occurred.

FIG. 8 shows a part of a telephone communication procedure executed in an MFP 2 according to a second embodiment of the invention. The MFP 2 has the same appearance and hardware configuration as the MFP 1 shown in FIG. 1. Most portions of the controlling configuration of the MFP 2 are same as those of the MFP 1, and only different portions will be described in detail hereafter.

That is, FIG. 8 is similar to FIG. 4 except for some additional steps included therein.

Step S202 is added between S200 and S210. In S202, a fade-out processing is applied to an end portion of the data segment before the interruption. FIG. 9 schematically shows an example of recorded data to which the fade-out and fade-in processes have been applied. In FIG. 9, po1 represents a time when the recording of the communication data was interrupted. Po2 represents a time which is earlier than time po1 by a predetermined time duration to (e.g., one second). The controller 54 controls the recording/replaying unit 54 to modify the data segment before the interruption (po1) such that the amplitude of the recording audio signal is gradually attenuated from time po2 to time po1 (i.e., the voice message corresponding to the data segment before the interruption fades out from time po2 to time po1. By modifying the data in this way, noises caused by operation of the handset or signals exchanged between the main body and the wireless handset 40 may be reduced.

Similarly, between steps S370 and S380, the fade-out processing (S372) is added.

Step S282 is added between S280 and S290. In S282, a fade-in processing is applied to a start portion of the data segment after the interruption. In FIG. 9, pi1 represents a time when the recording of the communication data was restarted. Pi2 represents a time which is later than time pi1 by a predetermined time duration ti (e.g., one second). The controller 54 controls the recording/replaying unit 54 to record the telephone communication when the recording is restarted after the interruption at pi1 such that the amplitude of the recording audio signal is gradually increases from zero to a predetermined level during a time duration from pi1 to pi2 (i.e., the voice message corresponding to the data segment after the interruption fades in from time pi1 to time pi2. By modifying the data in this way, noises caused by operation of the handset or signals exchanged between the main body and the wireless handset 40 may be reduced. Also in this case, by modifying the data in this way, noises caused by operation of the handset or signals exchanged between the main body and the wireless handset 40 may be reduced.

Similarly, between steps S450 and S460, the fade-in processing (452) is added.

According to the MFP 2 configured as above, the following advantages are further obtained in comparison with the MFP 1. That is, when the communication data of the telephone communication including an interruption during the communication, from time po2, which is earlier than time po1 at which the interruption starts, to time po1, the output voice fades out, and from time pi1, at which the recording is restarted, to time pi2, the output voice fades in. That is, the sound volume of the voice message is gradually lowered just before the position where the interruption occurred, and the sound volume of the voice message is gradually increased. Thus the user can easily recognize that the telephone communication is interrupted.

It should be noted that the invention is not limited to above-described exemplary embodiments, but various modification could be configured.

In the exemplary embodiments above, the MFPs 1 and 2 are described as apparatuses to which the present invention is applied. They are only examples, and the invention can be applied to any apparatus having the function of telephone and the function to record/replay telephone communication.

According to the embodiments, the procedures illustrated in the flowcharts are executed by the controller 52 of a computer system provided in the telephone terminal. However, the invention need not be limited to such a configuration, and part of or all of the procedures may be executed by one or more other computer system(s) which may be connected with the MPF 1 (or 2) with wired and/or wireless signal transmission paths.

According to the embodiments, programs having instructions to realize the procedures illustrated in the flowcharts are stored in the memory of the controller 52. The invention need not be limited to such a configuration. When the MFP 1 (or 2) is configured to input/output data with respect to a recording medium such as an FD (floppy disk®), CD-ROM, memory card and the like, part of or all of the procedures may be executed based on the data/program stored in such a recording medium.

In the above-described embodiments, the recording of the communication data is started when the operation for recording the telephone communication is performed (S130: YES). The invention need not be limited to this configuration, and other suitable condition may be alternatively or optionally checked in S130.

An example of such a suitable operation is the recording of the telephone communication is started when the off-hook of the handset (i.e., when the off-hook operation of one of the handset 100, audio input/output unit 70 or wireless handset 40) is detected. Optionally, the predetermined operation may be defined using the operation panel 20 or the operation panel 44 of the wireless handset 40.

In the above-described embodiments, when the handset 100 or the audio input/output unit 70 is used as the active handset, the recording of the communication data is started as the record/replay button 24 is depressed; and when the wireless handset 40 is the active handset, the recording is started by depressing the record button 44e. This may optionally be modified such that, even when the handset 100 or the audio input/output unit 70 is active, the recording is started by depressing the record button 44e and/or even when the wireless handset 40 is active, the recording is started by depressing the record/replay button 24.

In the above-described embodiments, the recording of the communication data is terminated when the operation for terminating the recording of the telephone communication is performed (S130: NO). The invention need not be limited to this configuration, and other suitable condition may be additionally or alternatively used to be checked in S170. Optionally, the suitable operation may be defined using the operation panel 20 or the operation panel 44 of the wireless handset 40.

Further, in the above-described embodiments, among the audio signals (pieces of audio data) preliminary stored in the recording/replaying unit 54, ones corresponding to the interruption data included in the communication data are retrieved and replayed for notification (see S680 of FIG. 7).

It is possible to modify the embodiments as follows. That is, in S220 and S390 (FIGS. 4 and 8), audio data representing the audio message to be output in S680 of FIG. 7 is generated. Then, the thus generated audio data is added to the communication data as the interruption data in S220 and S390. Corresponding to this modification, the playback procedure shown in FIG. 7 is modified such that, steps S640, S660-S710 are omitted, and when the controller 54 determines that the n-th communication data is recorded (S630: YES), S650 is executed. That is, in this modification, the playback procedure is only for replaying the recorded data, and no particular processing is required, while the interruption is notified. It should be noted that, instead of the data representing the audio message, data representing some audio sound or even silent data may be added as the audio data.

It is also possible that the fade-out effects applied in S202 and S372 may be applied after the recording of the communication data is terminated or when the communication data is replayed. Similarly, the fade-in recording in S282 and S252 in FIG. 8 can be modified such that the recorded data is modified, for example, after the recoding of the communication data is terminated. Alternatively, when the recorded data is replayed (cf. S670 and S710 of FIG. 7), the sound volume of the end portion of the data segment before the interruption data ds may be gradually decreased, and the sound volume of the beginning of the data segment after the interruption data ds may be gradually increased.

In the above embodiments, the interruption is notified by outputting a voice message in S680 of FIG. 7. The invention need not be limited to this configuration. For the purpose of notifying the interruption, a notifying sound (e.g., a sound having a predetermined wavelength) or (a part of) the holding sound may be output for a predetermined period. When the notification is made by the notifying sound, it may be convenient that the notifying sound is different from a sound delimiting respective calls as recorded. The predetermined period may be defined as a lapse of a certain time or a period during which the holding sound is repeated by a predetermined times.

Alternatively, in S680, the audio notification may not be output, instead the replaying is paused by a period same as the interruption period represented by the interruption data ds. With this configuration, the replayed voice message perfectly corresponds to the actual telephone communication. Although the replay corresponds to the actual communication in terms of lapse of time, the data size is saved in comparison with the conventional apparatus since the interruption and the duration thereof is represented by the interruption data ds.

In FIG. 7, when the communication data includes interruption data ds, after a data segment before an interruption is replayed (S670), the voice message is output (S680). This can be modified as follows.

FIG. 10 is a flowchart illustrating a modified playback procedure shown in FIG. 7. In this modification, before steps S670, step S662 is added. In S662, the controller 52 determines whether a time duration ts of the interruption (e.g., a duration between time po1 and pi1 in FIG. 9) is compared with a predetermined threshold value tp. When the time duration ts is relatively long (i.e., ts>tp), similarly to the procedure shown in FIG. 7, the interruption is notified (S680) after the data segment before the interruption is replayed (S670). When the time duration is relatively short (i.e., ts≦tp), the data segment before the interruption is replayed (S672), but the interruption is be notified.

According to the modification shown in FIG. 10, when ts≦tp (S662: NO), the notification is not made and the succeeding data segment is replayed immediately after the replay of the current data segment is finished. When the communication data is replayed without the notification of the interruption, discontinued voice messages are replayed continuously. The user might feel discomfort since the user hardly recognizes the existence of the interruption, and further, the voice messages around the interrupted portion may be unrecognizable. However, when the interrupted duration (ts) is relatively short, even if the succeeding voice messages are replayed with skipping the interruption, the user may recognize that the voice messages are continuous. Thus, by setting the appropriate value for the threshold value tp, the unnecessary notification of the interruption can be omitted. In particular, when there are many short interruptions within a piece of recorded telephone communication, audio notification of interruption at each interruption may bothersome. In such a case, the modification provides comfort to the user.

In the embodiments and modifications described above, the MFP 1 or 2 are connected to the PSTN 100 to perform the telephone communication. The invention need not be limited to this configuration. The MFP 1 or 2 may be connected to another communication network such as the Internet or IP (Internet Protocol) telephone network, alternatively of optionally. As aforementioned, the MFPs 1 and 2 are only examples, and the invention can be applied to any apparatus having the function of telephone terminal and the function to record/replay telephone communication. Such apparatuses include a normal facsimile machine which have functions of facsimile and telephone, a normal telephone having the function of telephone.

The present disclosure relates to the subject matter contained in Japanese Patent Application No. 2003-74223, filed on Mar. 18, 2003, which is expressly incorporated herein by reference in its entirety.

What is claimed is:

1. A telephone terminal having a function of telephone communication, comprising:
    a communication recording unit that records the telephone communication as communication data;
    an interruption controller that controls the communication recording unit to interrupt and to restart recording the telephone communication if the interruption occurs within a single call, the communication recording unit indexing a position, in the communication data, corresponding to the interruption of recording; and
    a replaying unit that replays the telephone communication as recorded based on the communication data, the replaying unit notifying that the recording was interrupted at the indexed position.

2. The telephone terminal according to claim 1,
    wherein the interruption controller controls the communication recording unit to stop recording when a first condition is satisfied, and
    wherein the interruption controller controls the communication recording unit to restart recording when a second condition is satisfied.

3. The telephone terminal according to claim 2, wherein the first condition is that a user operates the telephone terminal to switch a person subjected to the telephone communication from a first person to a second person according to a call-waiting function when the telephone communication with the first person is being recorded.

4. The telephone terminal according to claim 3, wherein the second condition is that the user operates the telephone terminal to switch a person subjected to the telephone communication from the second person to the first person when the telephone communication with the first person is being interrupted.

5. The telephone terminal according to claim 2, wherein an execution of a predetermined operation when the telephone communication is being recorded satisfies the first condition.

6. The telephone terminal according to claim 5, wherein the predetermined operation includes an operation of a predetermined operable member provided to the telephone terminal.

7. The telephone terminal according to claim 6, wherein an operation of the predetermined operable member when the recording of the telephone communication is being interrupted satisfies the second condition.

8. The telephone terminal according to claim 5, wherein the predetermined operation is an operation to hold the telephone communication.

9. The telephone terminal according to claim 8, wherein the operation to release the holding condition of the telephone communication satisfies the second condition.

10. The telephone terminal according to claim 2, wherein an execution of a predetermined operation when the telephone communication is being interrupted satisfies the second condition.

11. The telephone terminal according to claim 10, wherein the predetermined operation includes an operation of a predetermined operable member provided to the telephone terminal.

12. The telephone terminal according to claim 1, wherein the interruption controller is capable of controlling the communication recording unit to interrupt and restart the recording of the telephone communication plurality of times during one telephone call, the communication recording unit indexing a plurality of positions, in the communication data, respectively corresponding to the plurality of interruptions of recording.

13. The telephone terminal according to claim 1, wherein the telephone communication recording unit indexes the interrupted position by inserting predetermined data at the position of the communication data corresponding to the interruption.

14. The telephone terminal according to claim 13, wherein the interruption controller is capable of measuring a duration of the interruption of the recording of the telephone communication, the duration of the interruption being added to the predetermined data.

15. The telephone terminal according to claim 14, wherein the replaying unit notifies the duration of the interruption in accordance with the predetermined data.

16. The telephone terminal according to claim 15, wherein the replaying unit notifies the duration as a voice message.

17. The telephone terminal according to claim 14, wherein the replaying unit executes different operations based on the duration of the interruption.

18. The telephone terminal according to claim 17, wherein the replaying unit notifies the duration only when the duration is longer than a predetermined period.

19. The telephone terminal according to claim 17, wherein the replaying unit does not notify the duration when the duration is equal to a predetermined period or shorter.

20. The telephone terminal according to claim 13, wherein a quantity of the predetermined data is less than a quantity of data which would be generated if the communication data is kept recorded during a duration of the interruption.

21. The telephone terminal according to claim 13, wherein the predetermined data includes voice data representing a predetermined message.

22. The telephone terminal according to claim 13, wherein the interruption controller is capable of measuring a duration of the interruption of the recording of the telephone communication, the predetermined message including a vocalized duration of the interruption.

23. The telephone terminal according to claim 13, wherein the predetermined data includes silent data.

24. The telephone terminal according to claim 13, wherein the predetermined data includes audio data representing a predetermined audio sound.

25. The telephone terminal according to claim 1, wherein the replaying unit outputs a predetermined sound at the indexed position of the communication data.

26. The telephone terminal according to claim 1, wherein the replaying unit outputs a predetermined message at the indexed position of the communication data.

27. The telephone terminal according to claim 1, further comprising a data processor that applies a fade-out effect to part of the communication data immediately before the indexed position.

28. The telephone terminal according to claim 1, further comprising a data processor that applies a fade-in effect to part of the communication data immediately after the indexed position.

29. The telephone terminal according to claim 1, wherein the telephone communication recording unit starts recording the telephone communication in response to a predetermined operation by a user.

30. The telephone terminal according to claim 29, wherein the predetermined operation is an operation of a predetermined operable member provided to the telephone terminal.

31. The telephone terminal according to claim 29, wherein the predetermined operation is an off-hook operation.

32. The telephone terminal according to claim 1, wherein the telephone communication recording unit finishes recording the telephone communication in response to a predetermined operation by a user.

33. The telephone terminal according to claim 32, wherein the predetermined operation is an on-hook operation.

34. A telephone terminal having a function of telephone communication, comprising:
  a communication recording unit that records the telephone communication as communication data;
  an interruption controller that controls the communication recording unit to interrupt and to restart recording the telephone communication if the interruption occurs within a single call, the communication recording unit indexing a position of the communication data corresponding to the interruption of recording;
  a data controller that controls the communication recording unit to apply a predetermined operation to the communication data in accordance with the indexed position; and
  a replaying unit that replays the telephone communication data,
  wherein the communication data is configured to notify, when replayed, that the recording was interrupted at the indexed position.

35. The telephone terminal according to claim 34, wherein the predetermined operation includes inserting predetermined data at the indexed position.

36. The telephone terminal according to claim 35, wherein the predetermined data includes audio data.

37. The telephone terminal according to claim 36, wherein the audio data represents an audio signal of a predetermined silent period.

38. The telephone terminal according to claim 36, wherein the audio data represents an audio message.

39. The telephone terminal according to claim 34, wherein the predetermined operation includes modification of the communication data at a portion adjacent to the indexed position.

40. The telephone terminal according to claim 39, wherein the modification includes a modification of the communication data at a portion before the indexed position to exhibit a fade-out effect when replayed.

41. The telephone terminal according to claim 39, wherein the modification includes a modification of the communication data at a portion after the indexed position to exhibit a fade-in effect when replayed.

42. A telephone terminal having a function of telephone communication, comprising:
  a recording system that records various data;
  an audio output system that outputs various audio sounds;
  a recording control system that controls the recording system to record an audio signal of the telephone communication by a user with a first person as first communication data during a period from a predetermined operation by the user till a predetermined termination condition is satisfied;
  a replay control system that controls the audio output system to output the first communication data recorded by the recording system as a voice when operated by the user; and
  a communication holding system that holds, in response to an operation by the user, the telephone communication of the user with the first person;
  wherein the recording system interrupts the recording of the first communication data during a period, after the recording system was controlled by the recording control system to start recording the first communication data and when the telephone communication with the first person is held by the communication holding system,
  wherein the replay control system that controls the audio output system to output: part of the communication data recorded by the communication recording system and before a position where the recording was interrupted by the instruction of the recording control system as a voice; a notification sound that enables the user to recognize that the telephone communication with the first person has been interrupted; and a remainder of the communication data after the recording was restarted.

43. The telephone terminal according to claim 42, wherein the communication holding system holds or restarts, in response to an operation by the user, the telephone communication with the first person.

44. The telephone terminal according to claim 42, wherein the communication holding system holds, in response to an operation by the user, a telephone communication with one of the first person and a second person and establishes a telephone communication with the other of the first person and the second person so that a telephone communication with the first person and the second person is selectively interrupted/established.

45. The telephone terminal according to claim 44,
wherein the recoding control system controls the communication recording system to record the audio signals of the telephone communication with the second person when the telephone communication with the second person is established by the communication holding system, after the operation by the user till the predetermined termination condition is satisfied, as second communication data, the recording of the second communication data by the communication recording system, after the start of the recording and when the telephone communication with the second person is interrupted by the communication interrupting system, and
wherein the replay control system controls the audio output system to output the first communication data and the second communication data recorded by the communication recording system as a voice.

46. The telephone terminal according to claim 42, wherein the replay control system controls the audio output system to output an audio signal having a predetermined frequency as the notification sound.

47. The telephone terminal according to claim 42, further including a first interruption reckoning system that reckons, under control of the recording control system, an interrupted time from the interruption of the recording of the communication data to the restart thereof,
wherein the recording control system control the recording system to record interruption data indicative of the interrupted time reckoned by the first interruption reckoning system in relation to the communication data when it is recorded by the recording system, and
wherein the replay control system generates a message indicating that the telephone communication with the first person was interrupted for the interruption time which is indicated by the interruption data, and controls the audio output system to output the message as the notification sound.

48. The telephone terminal according to claim 47, further including a second interruption reckoning system that reckons, under control of the recording control system, an interrupted time from the interruption of the recording of the communication data to the restart thereof
wherein the recording control system control the recording system to record interruption data indicative of the interrupted time reckoned by the second interruption reckoning system in relation to the communication data when it is recorded by the recording system, and
wherein the replay control system controls the audio output system to output the notification sound only when the interrupted time indicated by the interruption data is equal to or longer than a predetermined period.

49. The telephone terminal according to claim 42, further including a first modifying system that modifies the communication data at a portion corresponding to a predetermined time earlier than a time when the recording is interrupted by the control of the recording control system to the time when the recording is interrupted such that the sound volume of the communication data at the portion fades out.

50. The telephone terminal according to claim 42, further including a second modifying system that modifies the communication data at a portion corresponding to a time when the recording is restarted after interrupted, by the control of the recording control system, to a position corresponding to a predetermined time later than time when the recording is restarted such that the sound volume of the communication data at the portion fades in.

51. A computer readable medium embedded with a computer program comprising computer readable instructions that causes a computer to function as a telephone terminal having a function of telephone communication, the program product causing the computer to:
record the telephone communication as communication data;
interrupt and restart recording of the telephone communication if the interruption occurs within a single call, a position, in the communication data, corresponding to the interruption of recording being indexed; and
replay the telephone communication as recorded based on the communication data, the interruption of recording being notified based on indexing.

52. A computer readable medium embedded with a computer program comprising computer readable instructions that causes a computer to function as a telephone terminal having a function of telephone communication, the program product causing the computer to:
record the telephone communication as communication data;
interrupt and restart recording of the telephone communication if the interruption occurs within a single call, the communication recording unit indexing a position of the communication data corresponding to the interruption of recording;
apply a predetermined operation to the communication data in accordance with the indexed position; and
replay the telephone communication data,
wherein the communication data is configured to notify, when replayed, that the recording was interrupted at the indexed position.

* * * * *